(12) United States Patent
Harris et al.

(10) Patent No.: US 11,774,827 B2
(45) Date of Patent: *Oct. 3, 2023

(54) REFLECTIVE MICROCELLS FOR ELECTROPHORETIC DISPLAYS AND METHODS OF MAKING THE SAME

(71) Applicant: E Ink Corporation, Billerica, MA (US)

(72) Inventors: George G. Harris, Woburn, MA (US); Jay William Anseth, Canton, MA (US)

(73) Assignee: E Ink Corporation, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/824,178

(22) Filed: May 25, 2022

(65) Prior Publication Data

US 2022/0291565 A1    Sep. 15, 2022

Related U.S. Application Data

(60) Continuation of application No. 17/014,123, filed on Sep. 8, 2020, now Pat. No. 11,372,306, which is a
(Continued)

(51) Int. Cl.
*G02F 1/167* (2019.01)
*B32B 3/30* (2006.01)
(Continued)

(52) U.S. Cl.
CPC .............. *G02F 1/167* (2013.01); *B32B 3/30* (2013.01); *B32B 7/06* (2013.01); *B32B 27/08* (2013.01);
(Continued)

(58) Field of Classification Search
CPC ........ G02F 1/167; G02F 1/1681; G02F 1/172; G02F 1/169; G02F 1/1679; G02F 1/16757; G02F 1/1675
See application file for complete search history.

(56) References Cited

U.S. PATENT DOCUMENTS 6,130,774 A    10/2000    Albert et al.
6,241,921 B1    6/2001    Jacobson et al.
(Continued)

FOREIGN PATENT DOCUMENTS

CN    101118361 A    2/2008

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Joseph P Martinez
(74) *Attorney, Agent, or Firm* — Brian D. Bean

(57) ABSTRACT

A polymeric film includes a plurality of tapered microcells containing a dispersion of a first group and a second group of charged particles. The first group and second group of charged particles having opposite charge polarities. The tapered microcells include a wall and at least a portion of the wall is configured to repel the first group of charged particles. Also provided is a method of making a laminate for an electrophoretic display comprising embossing a plurality of tapered microcells through a layer of polymeric film and into a release sheet to form an embossed film; laminating the embossed film to a layer of conductive material on a protective sheet to form a laminated film; removing the release sheet from the polymeric film to form an opening to an interior of each microcell of the laminated film; filling the microcells with a dispersion fluid; and sealing the microcells.

11 Claims, 5 Drawing Sheets

Related U.S. Application Data division of application No. 16/015,337, filed on Jun. 22, 2018, now Pat. No. 10,802,373.

(60) Provisional application No. 62/524,640, filed on Jun. 26, 2017.

(51) Int. Cl.
| | |
|---|---|
| *B32B 27/08* | (2006.01) |
| *B32B 38/06* | (2006.01) |
| *B32B 7/06* | (2019.01) |
| *B32B 37/10* | (2006.01) |
| *G02F 1/1339* | (2006.01) |
| *G02F 1/1341* | (2006.01) |
| *G02F 1/1335* | (2006.01) |
| *G02F 1/1681* | (2019.01) |

(52) U.S. Cl.
CPC ......... *B32B 37/1018* (2013.01); *B32B 38/06* (2013.01); *B32B 2255/10* (2013.01); *B32B 2255/205* (2013.01); *G02F 1/1339* (2013.01); *G02F 1/1341* (2013.01); *G02F 1/133553* (2013.01); *G02F 1/1681* (2019.01)

(56) References Cited

U.S. PATENT DOCUMENTS

| | | |
|---|---|---|
| 6,672,921 B1 | 1/2004 | Liang et al. |
| 6,751,007 B2 | 6/2004 | Liang et al. |
| 6,753,067 B2 | 6/2004 | Chen et al. |
| 6,781,745 B2 | 8/2004 | Chung et al. |
| 6,788,449 B2 | 9/2004 | Liang et al. |
| 6,788,452 B2 | 9/2004 | Liang et al. |
| 6,795,229 B2 | 9/2004 | Liang et al. |
| 6,806,995 B2 | 10/2004 | Chung et al. |
| 6,829,078 B2 | 12/2004 | Liang |
| 6,850,355 B2 | 2/2005 | Liang et al. |
| 6,865,012 B2 | 3/2005 | Liang et al. |
| 6,870,662 B2 | 3/2005 | Tseng et al. |
| 6,885,495 B2 | 4/2005 | Liang et al. |
| 6,922,276 B2 | 7/2005 | Zhang et al. |
| 6,930,818 B1 | 8/2005 | Liang et al. |
| 6,933,098 B2 | 8/2005 | Chan-Park et al. |
| 6,947,202 B2 | 9/2005 | Liang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,046,228 B2 | 5/2006 | Liang et al. |
| 7,050,040 B2 | 5/2006 | Daniel et al. |
| 7,072,095 B2 | 7/2006 | Liang et al. |
| 7,075,502 B1 | 7/2006 | Drzaic et al. |
| 7,079,303 B2 | 7/2006 | Hou et al. |
| 7,116,318 B2 | 10/2006 | Amundson et al. |
| 7,141,279 B2 | 11/2006 | Liang et al. |
| 7,144,942 B2 | 12/2006 | Zang et al. |
| 7,156,945 B2 | 1/2007 | Chaug et al. |
| 7,170,670 B2 | 1/2007 | Webber |
| 7,205,355 B2 | 4/2007 | Liang et al. |
| 7,233,429 B2 | 6/2007 | Liang |
| 7,236,291 B2 | 6/2007 | Kaga et al. |
| 7,261,920 B2 | 8/2007 | Haubrich et al. |
| 7,271,947 B2 | 9/2007 | Liang et al. |
| 7,304,780 B2 | 12/2007 | Liu et al. |
| 7,307,778 B2 | 12/2007 | Wang et al. |
| 7,312,784 B2 | 12/2007 | Baucom et al. |
| 7,321,459 B2 | 1/2008 | Masuda |
| 7,327,346 B2 | 2/2008 | Chung et al. |
| 7,347,957 B2 | 3/2008 | Wu et al. |
| 7,411,719 B2 | 8/2008 | Paolini, Jr. et al. |
| 7,453,445 B2 | 11/2008 | Amundson |
| 7,470,386 B2 | 12/2008 | Kang et al. |
| 7,504,050 B2 | 3/2009 | Weng et al. |
| 7,535,624 B2 | 5/2009 | Amundson et al. |
| 7,580,180 B2 | 8/2009 | Ho et al. |
| 7,679,814 B2 | 3/2010 | Paolini, Jr. et al. |
| 7,715,087 B2 | 5/2010 | Hou et al. |
| 7,715,088 B2 | 5/2010 | Liang et al. |
| 7,767,126 B2 | 8/2010 | Kang et al. |
| 7,839,564 B2 | 11/2010 | Whitesides et al. |
| 7,880,958 B2 | 2/2011 | Zang et al. |
| 7,929,198 B2 | 4/2011 | Lipovetskaya et al. |
| 8,002,948 B2 | 8/2011 | Haubrich et al. |
| 8,009,348 B2 | 8/2011 | Zehner et al. |
| 8,129,655 B2 | 3/2012 | Jacobson et al. |
| 8,154,790 B2 | 4/2012 | Wang et al. |
| 8,169,690 B2 | 5/2012 | Lin et al. |
| 8,441,432 B2 | 5/2013 | Zang et al. |
| 8,891,156 B2 | 11/2014 | Yang et al. |
| 8,902,491 B2 | 12/2014 | Wang et al. |
| 8,961,831 B2 | 2/2015 | Du et al. |
| 9,079,151 B2 | 7/2015 | Shu et al. |
| 9,279,906 B2 | 3/2016 | Kang |
| 9,291,872 B1 | 3/2016 | Lin et al. |
| 9,388,307 B2 | 7/2016 | Li et al. |
| 9,436,057 B2 | 9/2016 | Kang et al. |
| 9,436,058 B2 | 9/2016 | Li et al. |
| 9,470,917 B2 | 10/2016 | Lin et al. |
| 9,919,553 B2 | 3/2018 | Kang et al. |
| 10,087,344 B2 | 10/2018 | Moran |
| 10,444,553 B2 | 10/2019 | Laxton |
| 10,802,373 B1 | 10/2020 | Harris et al. |
| 2002/0075556 A1* | 6/2002 | Liang ............... B29C 39/18 359/290 |
| 2003/0203101 A1 | 10/2003 | Haubrich et al. |
| 2009/0153942 A1* | 6/2009 | Daniel .................. G02F 1/1677 445/25 |
| 2014/0050814 A1 | 2/2014 | Kang et al. |
| 2015/0005720 A1 | 1/2015 | Zang et al. |
| 2016/0012710 A1 | 1/2016 | Lu et al. |
| 2016/0059442 A1 | 3/2016 | Kang et al. |
| 2016/0291441 A1 | 10/2016 | Yamazaki |
| 2017/0121563 A1* | 5/2017 | Moran .................. G02F 1/1679 |

OTHER PUBLICATIONS

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2020/049660, dated Jun. 7, 2021.

\* cited by examiner

REFLECTIVE MICROCELLS FOR ELECTROPHORETIC DISPLAYS AND METHODS OF MAKING THE SAME

CROSS-REFERENCE TO RELATED APPLICATION

This application is a continuation of U.S. patent application Ser. No. 17/014,123, filed Sep. 8, 2020, which is a divisional of U.S. patent application Ser. No. 16/015,337 filed Jun. 22, 2018, now U.S. Pat. No. 10,802,373, which claimed priority to U.S. Provisional Application Ser. No. 62/524,640, filed Jun. 26, 2017. The entire disclosures of the aforementioned applications are herein incorporated by reference.

FIELD OF INVENTION

This invention relates to electrophoretic displays. More specifically, in one aspect this invention relates to improved microcells containing electrophoretic fluid for electrophoretic displays. In another aspect, this invention relates to methods of making improved microcells for electrophoretic displays.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. In a microcell electrophoretic display, the charged particles and the fluid are not encapsulated within microcapsules but instead are retained within a plurality of cavities formed within a carrier medium, typically a polymeric film. See, for example, International Application Publication No. WO 02/01281, and published US Application No. 2002/0075556. The technologies described above may be found, for example, in these patents and applications:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 6,672,921; 6,751,007; 6,753,067; 6,781,745; 6,788,452; 6,795,229; 6,806,995; 6,829,078; 6,833,177; 6,850,355; 6,865,012; 6,870,662; 6,885,495; 6,906,779; 6,930,818; 6,933,098; 6,947,202; 6,987,605;

7,046,228; 7,072,095; 7,079,303; 7,141,279; 7,156, 945; 7,205,355; 7,233,429; 7,261,920; 7,271,947; 7,304,780; 7,307,778; 7,327,346; 7,347,957; 7,470, 386; 7,504,050; 7,580,180; 7,715,087; 7,767,126; 7,880,958; 8,002,948; 8,154,790; 8,169,690; 8,441, 432; 8,582,197; 8,891,156; 9,279,906; 9,291,872; and 9,388,307; and U.S. Patent Applications Publication Nos. 2003/0175480; 2003/0175481; 2003/0179437; 2003/0203101; 2013/0321744; 2014/0050814; 2015/ 0085345; 2016/0059442; 2016/0004136; and 2016/ 0059617;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

A microcell electrophoretic display typically does not suffer from the clustering and settling failure mode of traditional electrophoretic devices and provides further advantages, such as the ability to print or coat the display on a wide variety of flexible and rigid substrates.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Electro-optic displays, including electrophoretic displays, can be costly; for example, the cost of the color LCD found in a portable computer is typically a substantial fraction of the entire cost of the computer. As the use of such displays spreads to devices, such as cellular telephones and personal digital assistants (PDA's), much less costly than portable computers, there is great pressure to reduce the costs of such displays. The ability to form layers of electrophoretic media by printing techniques on flexible substrates, as discussed above, opens up the possibility of reducing the cost of electrophoretic components of displays by using mass production techniques such as roll-to-roll coating using commercial equipment used for the production of coated papers, polymeric films and similar media.

Current electrophoretic displays may also suffer from inefficient reflectance in a white optical state. For example, referring to FIG. 1, a plurality of cubic microcells 10 embossed in a polymeric film are filled with an electrophoretic fluid containing a black pigment 12 and white pigment 14. The microcells 10 may be incorporated as a layer in a black and white electrophoretic display. When one or more pixels of the display are displaying a white optical state (as viewed from above in FIG. 1), a substantial amount of light may be transmitted through the white pigment layer 14 instead of being reflected back to the observer. The light entering the microcell 10 may be lost and likely absorbed by the black pigment layer 12. The light loss may contribute to dull color states Thus, there is a need for microcell designs for electrophoretic displays with improved reflectance during certain optical states, such as a white optical state.

SUMMARY OF THE INVENTION

It is one aspect of the present invention to provide a polymeric film comprising a plurality of tapered microcells containing a dispersion of a first group and a second group of charged particles. The first group of charged particles may have a charge polarity opposite to a charge polarity of the second group of charged particles. The tapered microcells include a wall and at least a portion of the wall is configured to repel the first group of charged particles.

It is another aspect of the present invention to provide a method of making a laminate for an electrophoretic display comprising embossing a plurality of microcells having a tapered geometry through a layer of polymeric film and into a release sheet to form an embossed film; laminating the embossed film to a layer of conductive material on a protective sheet to form a laminated film; removing the release sheet from the polymeric film to form an opening to an interior of each microcell of the laminated film; filling the microcells with a dispersion fluid; and sealing the microcells.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

FIG. 4 is a side cross-sectional view of a schematic of an electrophoretic display incorporating the microcells of FIG. 2a.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without such details.

The present invention seeks to provide a microcell design that improves light reflectance and minimizes light loss. The microcell design according to various embodiments of the present invention may include a tapered geometry to provide angled reflective walls that repel black or dark pigment. The various embodiments of the present invention may substantially improve the reflectivity when the microcell is displaying an extreme optical state, such as a white state. Increasing the white state may improve display visibility in low light conditions and may improve the color gamut of an electrophoretic display when a film comprising the microcells according to the present invention are combined with a color filter array (CFA).

Figure 1:
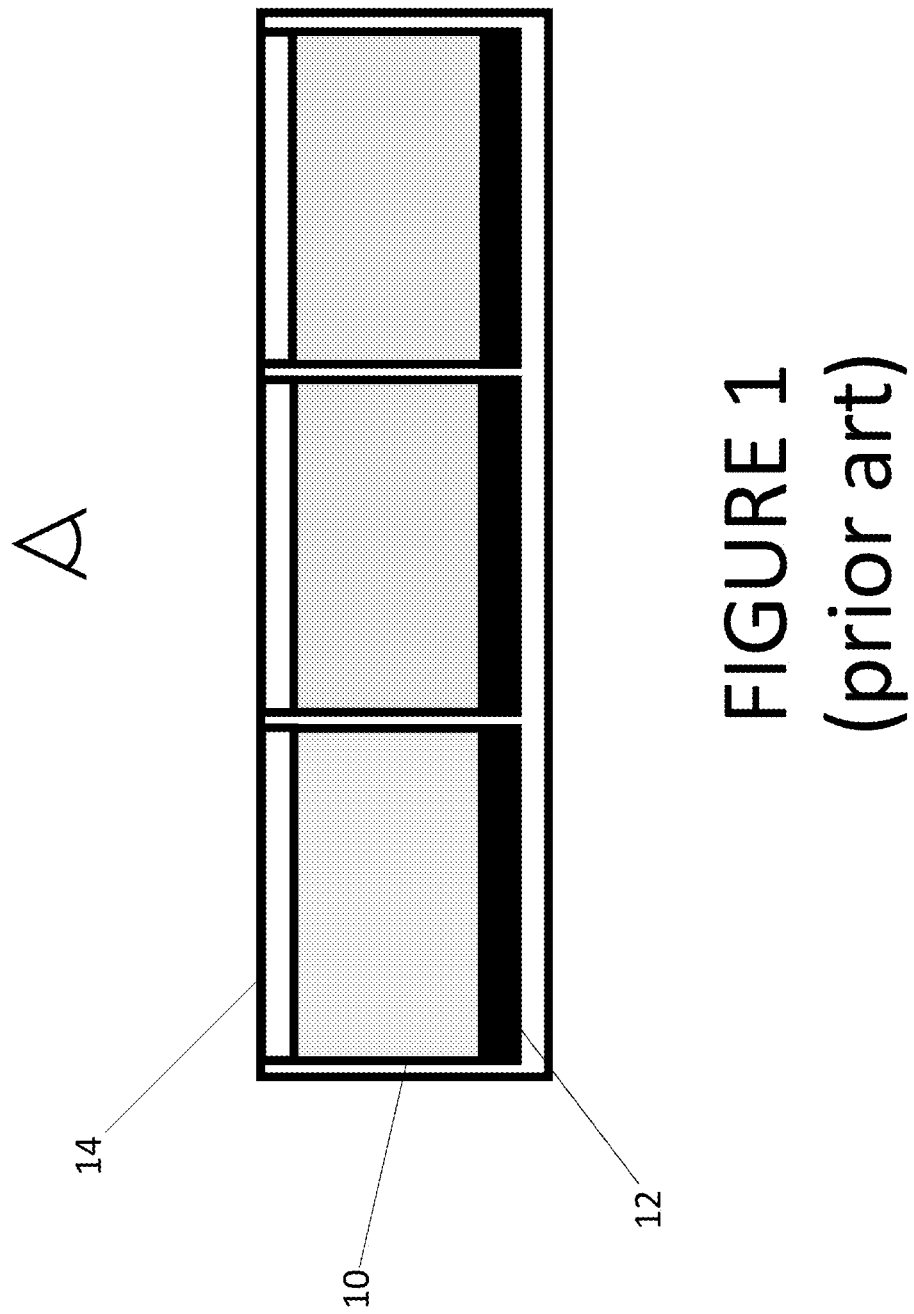
FIG. 1 is a side cross-sectional view of a series of microcells containing black and white pigment in a dispersion fluid.
Figure 2B:
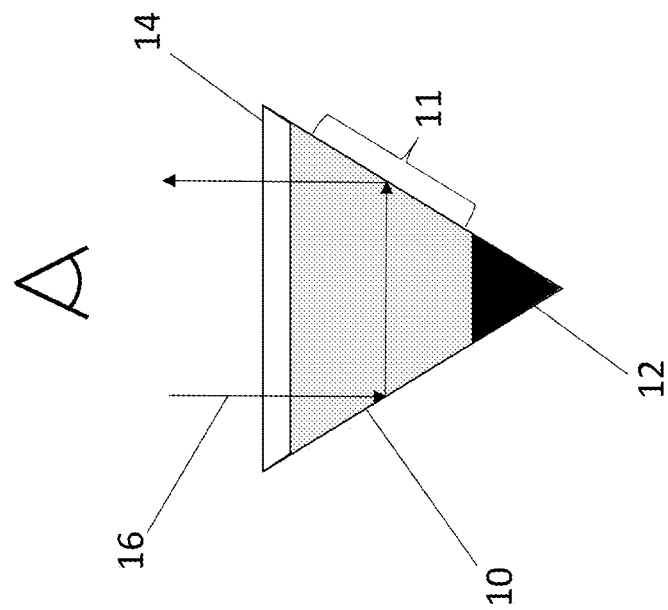
FIG. 2b is a side cross-sectional view of the microcell of FIG. 2a in a black optical state.
Figure 2A:
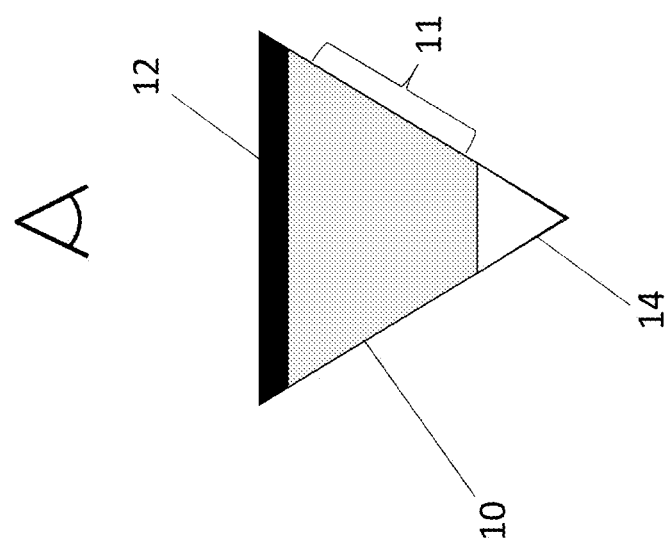
FIG. 2a is a side cross-sectional view of a microcell according to a first embodiment of the present invention in a white optical state.

According to one embodiment of the present invention illustrated in FIGS. 2a and 2b, the microcell 10 may contain a white pigment 14 and a black pigment 12 in a transparent fluid, wherein the microcell 10 has a tapered form, such as an inverted pyramid with the bases of the pyramids facing the viewer and the peaks of the pyramids furthest from the viewer. By providing a tapered geometry, the black pigment 12 will be located in the apex of the microcell 10 when a pixel comprising the microcell 10 has been switched to the white state (FIG. 2b). Therefore, unlike a cubic geometry, such as the microcell design of FIG. 1, the black pigment 12 in the tapered microcell of FIG. 2b has a smaller area on the viewer side than the viewing area of the white pigment 14 thereby reducing the likelihood of light loss from absorption by the black pigment 12.

The geometry of the microcells according to the various embodiments of the present invention also facilitates reflectance. For example, in FIG. 2b, at least a portion of the light 16 that passes through the white pigment 14 may be reflected off the walls 11 of the microcell 10 and back through the white pigment layer 14 to the viewer. As would be understood by those of skill in the art, light 16 represents only a single potential path for a portion of the light entering the microcell 10 and is not intended to suggest a path travelled by all light entering the microcell 10 through the white pigment 14. By using a polymeric material with a high reflective property to form the walls 11 of the microcells 10, light that is scattered through the microcell 10 will have several points from which the light may be reflected back out to the viewer. The angled walls 11 of the microcell 10 are preferably specular/mirrored, such that the walls of the microcell form a retroreflector. In another embodiment, the walls 11 of the microcell 10 may be provided in the form of diffuse reflectors instead of specular/mirrored surfaces. This may be accomplished by embossing the microcells 10 into a polymeric film filled with a reflective filler such as titania.

Figure 3C:
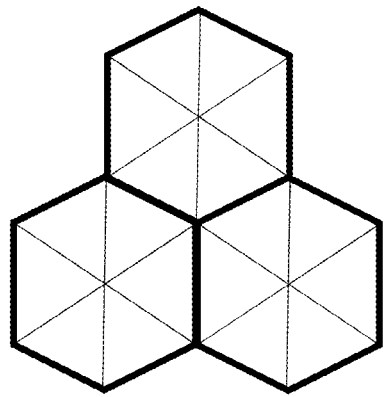
FIG. 3c is a plan view of three microcells according to a yet another embodiment of the present invention.
Figure 3B:
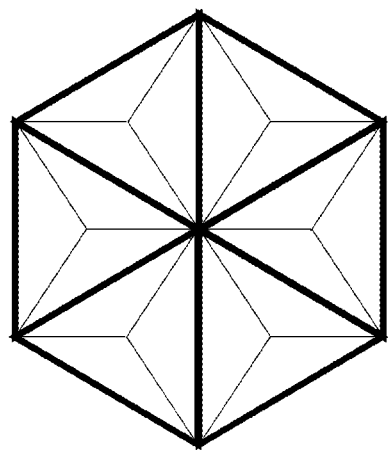
FIG. 3b is a plan view of six microcells according to a yet another embodiment of the present invention.
Figure 3A:
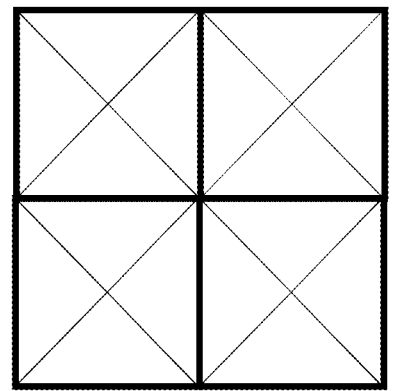
FIG. 3a is a plan view of four microcells according to another embodiment of the present invention.

The geometry of the microcells may be provided in a variety of shapes. For example, referring to the plan views of the various embodiments illustrated in FIGS. 3a, 3b, and 3c, the microcell geometry may be a four-sided, three-sided, or six-sided pyramid. The geometry is not limited to a pyramid structure. For example, the geometry may be provided in the form of a cone or a triangular prism; however, equilateral polygonal pyramids are preferred as the geometry allows for the close packing of microcells having similar angled walls within the display area. Furthermore, the apex of the tapered geometry of the microcells may optionally be truncated or hemispherical. However, hemispherical geometries are less preferred because such geometries would not pack the black or other colored pigment to as small an area away from the viewer.

Providing a wall angle for the microcell geometry that is steep, i.e. a more acute angle at the apex, may inhibit the black pigment from adhering to the wall and minimize the exposed area of the pigment packed into the apex. Furthermore, it is likely that steeper walls would result in more uniform coating of the viewing surface with pigment. For example, when switching from a black optical state to a white optical state, the white pigment is initially packed in the apex of the microcell and must then migrate from the apex to the viewing surface of the microcell. If the microcell is too shallow, the vertical distance travelled by the white pigment is short relative to the lateral dimension of the viewing area. For relatively steeper walls, the ratio of lateral to vertical distance travelled by the pigment is lower. A high ratio is likely to result in a thicker pigment coating in the center of the viewing area and a thinner, more transmissive coating about the perimeter of the viewing area upon switching the optical state. The ratio of lateral to vertical movement of the pigment should be selected to promote substantially uniform coverage of the pigment across the entire viewing area of each microcell. Other factors may also be considered when selecting the geometry of the microcell. For example, a shallow geometry will promote reflectivity by providing a shorter path for the light to be reflected. The dimensions of the microcell geometry may also be selected based on the desired display resolution, contrast, and switching speed of the electrophoretic display. In a preferred embodiment, the depth of the microcells is 20 to 50 microns.

Providing the microcells with a tapered geometry may also result in an increase of optically active surface area of the electrophoretic display. Referring again to FIG. 1, increasing the active surface of the electrophoretic display requires decreasing the vertical wall thickness of the cubic microcells 10 or incorporating a microlens in the microcell. However, manufacturing vertical walls for a microcell becomes increasingly difficult as the wall thickness decreases because of the risk of portions of the microcells being torn from the film and remaining on the embossing tool during the embossing process. Also, the use of a microlens may result in a decreased viewing angle. The use of a tapered geometry for the microcell therefore offers an easier manufacturing method that increases the potential optically active surface area without compromising the viewing angle range of the electrophoretic display.

Figure 4:
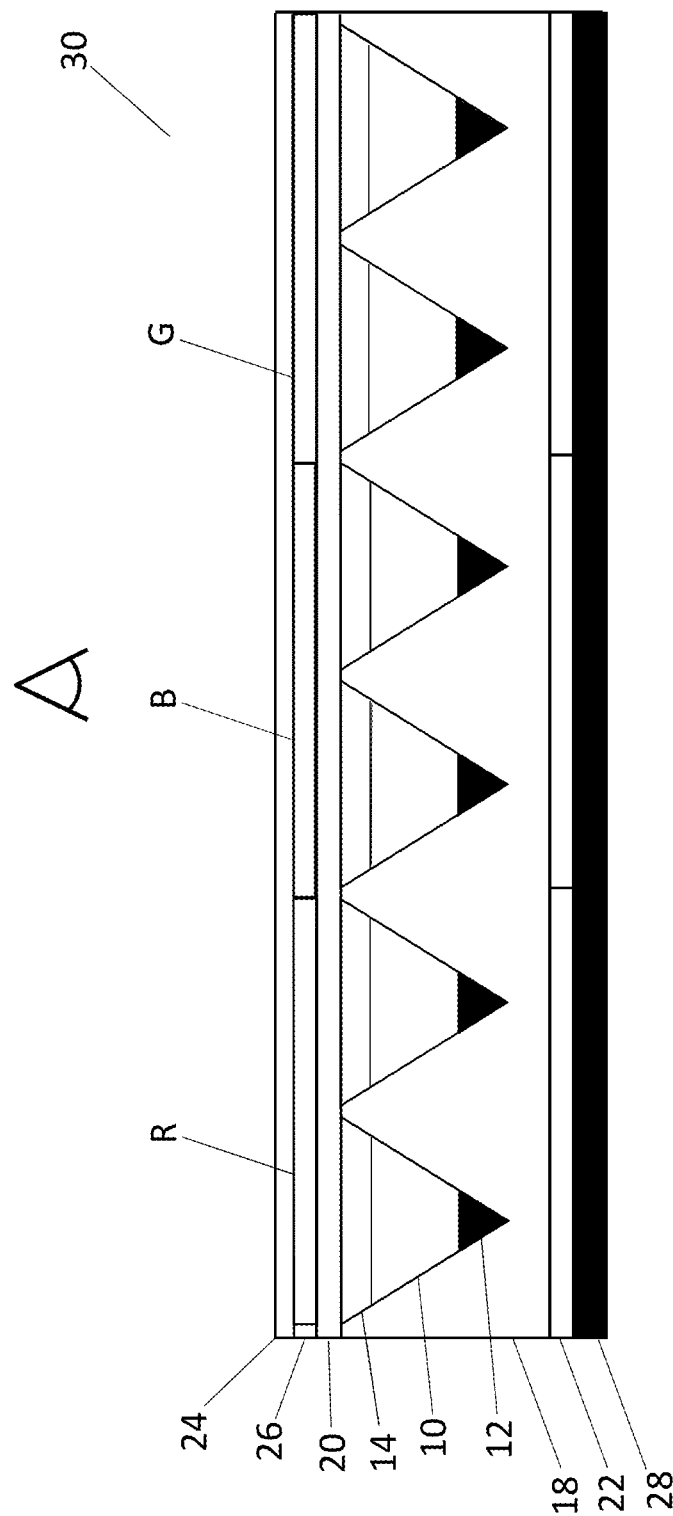

Referring to FIG. 4, for example, a polymeric film embossed with microcells 10 having a tapered geometry may be incorporated in an electrophoretic display 30. As would be understood by those of skill in the art, FIG. 4 is not drawn to scale and is a schematic representation of the cross-section of a laminated electrophoretic display. A polymeric film 18 embossed with a plurality of sealed microcells 10 may be laminated between a series of pixel electrodes 22 and a continuous front electrode 20 that is light-transmissive conductive material, such as a thin layer of indium tin oxide (ITO). The pixel electrodes 22 may be provided in the form of an array of thin film transistors (TFT) on a backplane 28. The top layers of the laminated display 30 further comprises a protective light-transmissive layer 24, such as PET, and an optional CFA 26 comprising red (R), green (G), and blue (B) areas that is also light-transmissive. Each of the microcells 10 are filled with a dispersion fluid containing charged white pigment 14 and charged black pigment 12. Therefore, excluding the optional CFA 26 will provide a black and white display. An adhesive layer may be incorporated between one or more pairs of adjacent layers described above, so that the layers may be laminated together.

In an alternative embodiment of an electrophoretic display, the location of the single continuous electrode layer and the pixel electrodes may be reversed, such that the single continuous electrode layer is located on the backplane and the pixel electrodes are located on the viewing side of the microcells. In this embodiment, it is not necessary for the single continuous electrode layer to be light-transmissive; however, the pixel electrodes must be light-transmissive. In this arrangement, it may be possible to provide colored pixel electrodes, so that the pixel electrodes may simultaneously serve as the CFA.

In another embodiment of the present invention, a method of making the tapered microcells is provided. As is known by those of skill in the art of microcell formation, embossing techniques are typically used wherein a tool, such as an embossing cylinder having a pattern in the shape of the microcells on its surface, is rolled onto a polymeric film. After embossing, the microcells are filled with a dispersion containing the charged pigment. To seal the microcells, a crosslinkable oligomeric or monomeric fluid may be coated over the filled microcells. An alternative sealing step may include laminating a sealant layer over the cups.

Figure 5:
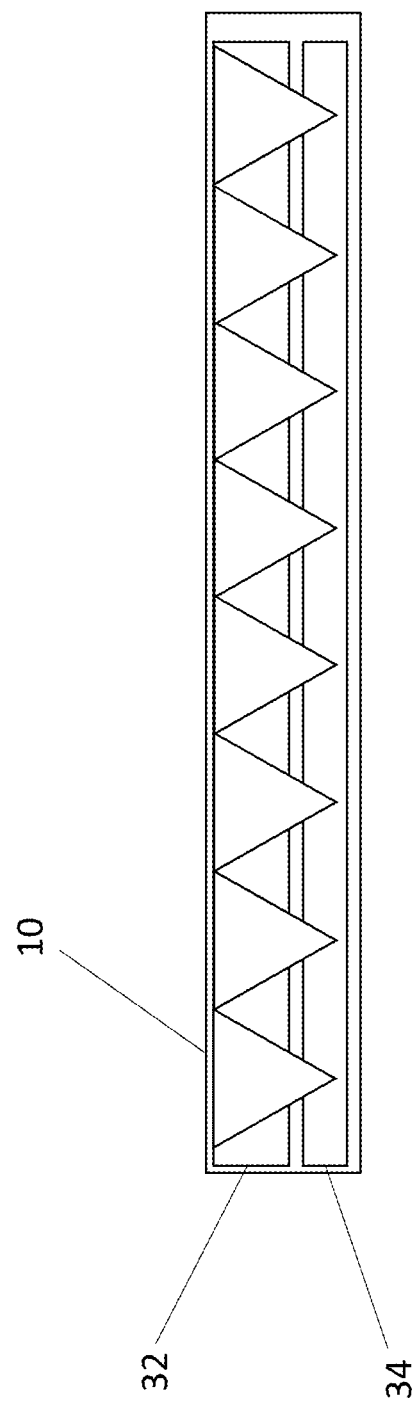
FIG. 5 is a side cross-sectional view of an embossed polymeric film and release sheet used in a method according to another embodiment of the present invention.

Referring to FIG. 5, the most preferred method of making and sealing the microcells according to the present invention comprises embossing the microcells in a polymeric film with a plurality of microcells having a tapered geometry, laminating the embossed polymeric film to a continuous front electrode layer, forming openings in the microcells, filling the interior of the microcells with a dispersion fluid through the small openings, and sealing the microcells.

The embossing step of the preferred method may comprise embossing an array of microcells 10 having a tapered geometry into a polymeric film 32, such as polyester, that is laminated to a release sheet 34. The film should be highly reflective by metallizing or incorporating reflective additives in the polymeric film, for example. If the polymeric film is metallized prior to embossing, the metal layer would most likely become discontinuous at all the edges of the microcell thereby avoiding electrical shorts between the front and rear electrodes of the display. A non-conductive reflective coating designed for constructive interference may also be applied to the film, such as the commercially available films used to improve emissive display backlight efficiency known to those of skill in the art, for example. The non-conductive reflective coating is preferably applied after embossing because the coatings are typically composed of oxides that may not survive embossing.

In a preferred embodiment of the present invention, the reflective coating on the embossed polymeric film may be a dielectric mirror. As known to those of skill in the art, a dielectric mirror comprises a plurality of thin layers of dielectric material deposited on a substrate. The reflectivity properties of the dielectric mirror depend on the type of dielectric material and the thickness of the coating. Various thin-film deposition methods may be employed to manufacture the dielectric mirror, such as physical vapor deposition (e.g. evaporative deposition and ion beam assisted deposition), chemical vapor deposition, ion beam deposition, molecular beam epitaxy, and sputter deposition. Dielectric materials used to form the dielectric mirror include, but are not limited to, aluminum, magnesium fluoride, silicon dioxide, tantalum pentoxide, zinc sulfide (n=2.32), and titanium dioxide (n=2.4).

To further promote reflectivity of the microcell walls, the various embodiments of the present invention may include features to prevent the black pigment from adhering to the walls of the microcell. In order to limit the presence of the black pigment to either spreading across the front viewing surface or packing into the apex of the microcell, the walls may be surface treated to repel the black pigment. For example, the microcell walls may be coated with a fluorinated polymer or other low surface energy material. Alternatively, after metallizing the surface of the microcells, the walls of the microcells may be treated with the same chargeable groups used to form the electrophoretic black pigment. If the microcell walls have a charge polarity that is similar to the charge polarity of the black pigment, the microcell walls will repel the black pigment.

In one embodiment, the metallized surface of the embossed polymeric film may include reactive sites that may be reacted with a reagent having a silane moiety bonded to one or more polar groups and/or one or more polymeric/polymerizable groups. The reactive sites may be hydroxyl groups, amine groups, carboxylic acid groups or derivatives thereof (e.g., amides or esters), alcohol or phenol groups or halogens, depending on the chemical functionality of the material used to provide the microcells walls with a reflective surface. The reactive sites may also be planted onto the surface of the microcell walls by conventional means or by special treatment such as hydration as described in U.S. Ser. No. 13/149,599 filed on May 31, 2011, the content of which is incorporated herein by reference in its entirety.

The polar group of the reagent may contribute charge to the microcell wall surface. For example, polar groups such as —NH— may contribute a positive charge and polar groups such as —OH or —COOH may contribute a negative charge. The polymeric/polymerizable group includes, but is not limited to, vinyl, acrylate, methacrylate groups or the like.

Reactive agents may include, but are not limited to N-(3-acryloxy-2-hydroxypropyl)-3-aminopropyltriethoxysilane (Gelest), 3-(N-allylamino)propyltrimethoxysilane (Gelest), 3-(N-styrylmethyl-2-aminoethylamino)-propyltrimethoxysilane (Gelest) or vinylbenzyl aminoethylaminopropyl-trimethoxysilane (Z-6032, by Dow Corning).

The silane coupling reaction of the reagent to the microcell surface may be initiated by first hydrolyzing the silane moiety to form a reactive silanol group (Si—OH) which can subsequently bond with hydroxyl groups at the surface of the embossed film via a condensation reaction.

To prevent the white pigment having an opposite charge polarity from strongly adhering to the microcell walls, a steric stabilizing layer may be added to the walls in the same manner as is used on the black pigment. For example after the silane coupling reaction, the polymeric/polymerizable group may be polymerized if necessary with one or more types of monomers, oligomers or polymers, and combinations thereof, to form polymer stabilizers. The polymer stabilizers are desired to create a steric barrier of about 1 nm to about 50 nm, preferably about 5 nm to about 30 nm, and more preferably about 10 nm to about 20 nm, in thickness, on the microcell wall surface.

Suitable polymers, in the context of the present invention, may include, but are not limited to, polyethylene, polypropylene, polyacrylate, polyurethane, polyester or polysiloxane. Suitable monomers include, but are not limited to, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate and n-octadecyl methacrylate. Selection of the material for the polymer stabilizers would depend on the compatibility of the material with the solvent used in the electrophoretic fluid.

The combined thickness of the polymeric film 32 and release sheet 34 should be greater than the desired final dimensions of the geometry of the microcells. The polymeric film 32 should have a depth that is less than the height of the corresponding pattern on the embossing tool to ensure that the embossing tool penetrates through the polymeric film 32 and into the release sheet 34 during embossing. The release sheet 34 should have approximately the same elastic modulus of the polymeric film 32 and a sufficient thickness, so that the embossing cylinder will not be damaged by the opposing cylinder tool surface. In a preferred embodiment, the release sheet may comprise silicone coated polyethylene terephthalate.

The laminating step of the preferred method may comprise laminating a protective PET layer, optional CFA and front plane electrode film (ITO), such as layers 24, 26, and 20 in FIG. 4, onto the open ends of the microcells, e.g. the base of the pyramidal microcells 10 in FIG. 5. An electrical passivation layer may also be included between the microcells and the PET-ITO layer, as well as an adhesive layer. It is preferred to laminate the PET-ITO layer to the polymeric film prior to filling and sealing the microcells, so that the pattern of microcells include closely packed cells to maximize the active area fraction of the display.

The forming of openings in each of the microcells may comprise separating the release sheet 34 from the polymeric film 32 to remove the bottom portion of the embossed microcells 10, thereby forming a small hole at the bottom of each of the microcells 10. The width of the holes should be large enough to allow easy access to the interior of the microcells for the dispersion fluid, but of minimal size to facilitate sealing after filling.

The filling step of the preferred method may be achieved by various techniques.

In one method, the microcells may be filled by first evacuating the interiors of the microcells, such as by placing the laminated polymeric film 32 and PET-ITO layer with the release sheet 34 removed in a vacuum chamber. After applying a vacuum to evacuate the microcells of gas, the dispersion fluid may be applied onto the surface of the polymeric film 32 containing the small holes immediately followed by release of the vacuum to draw the dispersion fluid into the microcells. To minimize the potential for solvent evaporation in the dispersion fluid, it is preferred to place the combined polymeric film 32 and PET-ITO layer in a vacuum chamber having as small a volume as possible, i.e. slightly larger than the volume of the combined polymeric film 32 and PET-ITO layer, and releasing the vacuum as soon as a sufficient volume of dispersion fluid for filling the microcells has been applied to the polymeric film 32.

Another method of filling the microcells may comprise immersing the laminated polyester film 32 and PET-ITO layer with the release sheet 34 removed in an ultrasonic bath filled with the dispersion fluid. The ultrasonic agitation would drive the gas out of the microcells to be replaced by the dispersion fluid. The bath may be held under slight vacuum to accelerate the process if necessary. Ultrasonic agitation is a preferred filling method because of the potential for being scalable to a continuous process.

Yet another filling method may comprise filling the microcells with a solvent vapor that has a boiling point below ambient temperature, for example, but above the pour point or freezing temperature of the dispersion fluid. The laminated polymeric film 32 and PET-ITO layer with the release sheet 34 removed may then be immersed in the dispersion fluid and subsequently cooled to a temperature below the boiling point of the solvent vapor in the microcells. This would cause the solvent vapor to condense and draw the dispersion fluid into the microcells. The solvent vapor is preferably miscible in the dispersion fluid.

When the microcells are filled with the dispersion fluid, a sealant that is preferably immiscible in the dispersion fluid may be used to seal the microcells. A lamination adhesive that simultaneously meets the electrical, optical, and mechanical requirements of the electrophoretic display and has low solvent permeability may be used to seal the microcells and form a front plane laminate (FPL) comprising the microcell design of the present invention. Alternatively, a separate sealant may be used to seal the microcells prior to applying a layer of lamination adhesive and optional releasable sheet for forming an FPL. Because the openings in the polymeric film 32 are small relative to the overall area of the polymeric film, the surface of the polymeric film 32 will provide an adequate area for wetting and adhesion with the sealant. Because the sealant is applied to the rear non-viewing surface of the electrophoretic display of this preferred method, the sealant is less likely to interfere with the optical properties of the display.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A method of making a laminate for an electrophoretic display, the method comprising:
    coupling a layer of polymeric film to a release sheet with an adhesive layer;
    embossing a plurality of tapered microcells through the layer of polymeric film, through the adhesive layer, and into the release sheet to form an embossed film, the embossed film having a top side with wider holes and a bottom side adjacent the adhesive layer having smaller holes at the bottom of each microcell;
    laminating the top side of the embossed film to a layer of conductive material on a protective sheet to form a laminated film;
    removing the release sheet from the bottom side of the embossed film to form a plurality of openings in the tapered microcells, thereby providing access through the smaller holes to an interior of each microcell of the laminated film;
    filling the interiors of the microcells with a dispersion fluid through the smaller holes; and
    sealing the microcells.

2. The method of claim 1, wherein the polymeric film includes a metallized surface.

3. The method of claim 1, wherein the polymeric film comprises a reflective additive.

4. The method of claim 1, wherein a color filter array is located between the protective sheet and the layer of conductive material.

5. The method of claim 1, wherein the filling step comprises:
   placing the laminated film having the opening to the interior of each microcell in a vacuum chamber,
   evacuating the interior of each microcell to create a vacuum within the vacuum chamber,
   applying the dispersion fluid to the opening of each microcell, and
   releasing the vacuum within the vacuum chamber.

6. The method of claim 1, wherein the filling step comprises immersing the laminated film having the opening to the interior of each microcell in an ultrasonic bath filled with the dispersion fluid.

7. The method of claim 1, wherein the filling step comprises:
   filling the interior of each microcell with a solvent having a boiling point above a pour point or freezing point of the dispersion fluid;
   immersing the laminated film having the opening to the interior of each microcell in the dispersion fluid; and
   lowering the temperature of the solvent below the boiling point of the solvent to draw the dispersion fluid into the interior of each microcell.

8. The method of claim 1, wherein the sealing step comprises covering the opening of each microcell with a sealant.

9. The method of claim 1, wherein the tapered microcells have an inverted pyramid form.

10. The method of claim 1, wherein the tapered microcells have an inverted cone form.

11. The method of claim 1, wherein the tapered microcells have an inverted triangular prism form.

* * * * *